(12) United States Patent
Dix et al.

(10) Patent No.: US 8,296,052 B2
(45) Date of Patent: Oct. 23, 2012

(54) METHOD FOR AVOIDING POINT ROWS FOR QUADRILATERAL FIELDS USING AUTOGUIDANCE

(75) Inventors: Peter J. Dix, Naperville, IL (US); Keith Wendte, Willowbrook, IL (US)

(73) Assignee: CNH America LLC

( * ) Notice: Subject to any disclaimer, the term of this patent is extended or adjusted under 35 U.S.C. 154(b) by 654 days.

(21) Appl. No.: 12/420,560

(22) Filed: Apr. 8, 2009

(65) Prior Publication Data

US 2010/0262342 A1    Oct. 14, 2010

(51) Int. Cl.
*G01C 21/00*    (2006.01)
(52) U.S. Cl. ............................ 701/213; 701/207; 701/200
(58) Field of Classification Search .................... None
See application file for complete search history.

(56) References Cited

U.S. PATENT DOCUMENTS

| | | | |
|---|---|---|---|
| 5,406,491 A | 4/1995 | Lima | |
| 5,646,846 A | 7/1997 | Bruce et al. | |
| 5,802,492 A | 9/1998 | DeLorme et al. | |
| 5,995,902 A * | 11/1999 | Monson | 701/202 |
| 6,070,673 A | 6/2000 | Wendte | |
| 6,088,644 A * | 7/2000 | Brandt et al. | 701/50 |
| 6,128,574 A | 10/2000 | Diekhans | |
| 6,236,924 B1 | 5/2001 | Motz et al. | |
| 6,321,158 B1 | 11/2001 | DeLorme et al. | |
| 6,505,124 B2 | 1/2003 | Carr et al. | |
| 6,865,465 B2 | 3/2005 | McClure | |
| 6,907,336 B2 * | 6/2005 | Gray et al. | 701/50 |
| 6,941,225 B2 | 9/2005 | Upadhyaya et al. | |
| 7,451,030 B2 * | 11/2008 | Eglington et al. | 701/50 |
| 2007/0021913 A1 | 1/2007 | Heiniger et al. | |
| 2007/0083299 A1 * | 4/2007 | Lindores | 701/2 |
| 2009/0118904 A1 * | 5/2009 | Birnie | 701/41 |

FOREIGN PATENT DOCUMENTS

| EP | 0730819 | 9/1996 |
|---|---|---|
| EP | 1847898 | 10/2007 |

* cited by examiner

*Primary Examiner* — F. Zeender
*Assistant Examiner* — Christopher Buchanan
(74) *Attorney, Agent, or Firm* — Sue C. Watson; Patrick Sheldrake (57) ABSTRACT

A method for generating a swath pattern avoiding point rows for a work vehicle to be driven in a region of a field, which region can be described as having a first side boundary and an opposite second side boundary extending divergently between a first and an opposite second end boundary, the method generating a swath pattern including side by side swaths having centerlines that diverge uniformly between the end boundaries, the method also generating a plurality of swath patterns including options for disabling one or more individual rows of an implement for selection by an operator.

20 Claims, 5 Drawing Sheets

METHOD FOR AVOIDING POINT ROWS FOR QUADRILATERAL FIELDS USING AUTOGUIDANCE

TECHNICAL FIELD

The present invention relates generally to methods for generating swath patterns for GPS based vehicle guidance systems, and more particularly to a method for generating a swath pattern avoiding point rows for a quadrilateral region of a field including opposite side boundaries extending divergently between opposite end boundaries, the swath pattern including side by side swaths having centerlines that diverge uniformly between the end boundaries.

BACKGROUND ART

Off road work vehicles in the agricultural, mining and construction fields, such as tractors, and the like, have traditionally operated with manual steering. Improvements in control system design and related position sensing technology, such as global positioning systems (GPS), including differential correction systems, as well as real time kinematic (RTK) satellite navigation have led to an increase in the use of automatic guidance control systems for these vehicles. The combination of improved navigation input signals precisely identifying vehicle position and speed with sophisticated on board vehicle electronic control systems allows for automatic guidance systems capable of steering the vehicle with a high degree of accuracy when traversing terrain.

To provide this control, the prior art teaches using satellite positioning information by an onboard vehicle navigation control system to accurately determine and control a vehicle's position while operating in a field. A preplanned route, based on information previously known about the terrain of the field, or a control system generated route may be used. The control methods are well known in the art, and may involve multiple position transmitters or receivers, with various signals used to derive vehicle location, elevation, direction of travel or heading, and speed.

The task of precision guidance of an agricultural vehicle involves not only accurately determining vehicle position in a field, but also defining an efficient array of paths or swaths to be followed by the vehicle that will create an overall swath pattern that efficiently and effectively covers the crop area of a field. The pattern must be located and oriented on the field, and the physical characteristics and limitations of the vehicle and coupled implement must be identified and provided to the navigation system. Implement or header width, location of the implement or header relative to the vehicle, and limitations of the vehicle and associated implement movement, such as minimum turning radius, must also be considered. With this information it is possible to define a series of swaths for the vehicle to travel in an attempt to cover all cultivatable portions of a field without unnecessary gaps or overlaps.

For a rectangular region of a field, swath patterns are typically generated including side by side swaths spaced evenly at the width of the implement or header to cover the field without substantial gaps or overlaps. However, unless the width of the field is an exact multiple of the implement or header width, generation of swath lines in this manner will result in at least one, usually the last swath of the field having a different width, generally more narrow than the width of the implement or header. This swath represents an opportunity for gaps or overlap in the region of the field.

Often swath patterns must be generated for fields, or regions thereof, that are not rectangular but have opposite, diverging sides. One such region can be described as having a first end boundary, a second end boundary opposite to the first end boundary, a first side boundary and a second side boundary opposite to the first side boundary, and the first and second side boundaries extending divergently between the first and second end boundaries. This region is typically characterized as having one end boundary wider than the other end boundary. The methods of generating swath patterns for rectangular fields, when applied to this type of field, typically results in point rows, or shorter swaths adjacent to the wider end of the field. Rather than extending between the end boundaries, the shorter swaths of point rows extend between an end boundary and a side boundary. Since work vehicles generally use wide implements or headers, the additional turns required for planting along the shorter swaths is difficult and time consuming.

Generating swath patterns including point rows presents other inherent disadvantages also. Point rows, as well as the smaller last swath of the rectangular field, tend to cause inefficient use of seeds, applied nutrients, chemicals, and the like, especially when the operator is unable to control the operation of individual rows or sections of an implement. In this case, working the point rows by overlapping previously worked swaths can result in damage to crops and/or reduced crop yield. Working the point rows by driving outside the field boundary, if possible, results in wasted product outside the field boundary. When the operator can control the operation of individual rows or sections of the implement, the effective width of the implement can be reduced, and overlap of the output disabled rows over previously worked rows does not result in wasted resources by working the same rows twice. However, the process of working point rows is still difficult and time consuming because the operator must determine which rows and/or sections to disable and then drive the work vehicle over the shorter point rows. Finally, failure to work the point rows and/or the shorter or more narrow swaths results in an unplanted section of the field, which allows weeds to grow and seed weeds into other parts of the field.

Another disadvantage presented by generation of swath patterns in the above described manner is the lack of control over the position of the work vehicle upon completion of work in the field. An operator may prefer to start and complete work on the field at the same end to avoid having to drive the length of the field in a non-operational mode once work on the field is complete. Alternatively the operator may prefer to complete work on the opposite end of the field so as to be closer to another region to be worked. Non-operational passes of a work vehicle over a field result in wasted time, resources, unnecessary soil compaction, and the like.

What is sought is a method to generate swath patterns for a quadrilateral shaped field having opposite sides which divergently extend between opposite ends which overcomes at least one of the problems, shortcomings or disadvantages set forth above.

SUMMARY OF THE INVENTION

What is disclosed is a method to generate swath patterns for a quadrilateral shaped field having opposite sides which divergently extend between opposite ends which overcomes at least one of the problems, shortcomings or disadvantages set forth above.

According to a preferred embodiment of the present invention a method for generating a swath pattern to be driven by a work vehicle over a quadrilateral shaped region is provided. A representative region of the field is bounded by a first end boundary, a second end boundary opposite to the first end boundary, a first side boundary and a second side boundary opposite to the first side boundary, the first and second side boundaries extending divergently between the first and second end boundaries. The method includes determining a number of swaths for the swath pattern as a function of a lateral extent of an implement of the work vehicle, and at least one of a first lateral extent of the first end boundary and a second lateral extent of the second end boundary. The method further includes generating the swath pattern including side by side individual swaths each having a centerline extending between the first and second end boundaries thereof. The centerlines of the side by side ones of the swaths diverge from the first end boundary towards the second end boundary substantially uniformly across the region from the first side boundary to the second side boundary. As a result of the uniform divergence of the centerlines, a centerline of the swath adjacent to the side boundary is parallel to the side boundary.

According to an aspect of the present invention, a first swath width is determined as a function of the first lateral extent and the number of swath lines and a second swath width is determined as a function of the second lateral extent and the number of swath lines. Substantially all of the centerlines of the side by side ones of the swaths are spaced at the first swath width adjacent to the first end boundary, and substantially all of the centerlines of the side by side ones of the swaths are spaced at the second swath width adjacent to the second end boundary.

According to another aspect of the invention, the number of swaths is determined as a function of the end boundary adjacent to completion of the swath pattern, such that the number of swaths is even when the swath pattern is completed adjacent to the first end boundary and the number of swaths is odd when the swath pattern is completed adjacent to the second end boundary.

According to yet another aspect of the present invention, the number of swaths is determined as a function of a number of individual output controllable rows of the implement. The swath pattern is generated including a final swath having an adjusted first swath width adjacent to the first end boundary and an adjusted second swath width adjacent to the second end boundary. The adjusted first and second swath widths are adjusted as a function of a number of output disabled rows of the implement disabled during the final swath.

According to another aspect of the invention, when the second swath width is larger than the first swath width, the output of at least one outermost individual row of the implement is increased when the implement is adjacent to the second end boundary. Alternately, or in addition, the output of at least one outermost individual row of the implement is decreased when the implement is adjacent to the first end boundary.

In another preferred embodiment of the invention, a plurality of swath patterns is generated for the region and information representative of the plurality of swath patterns is displayed for selection of a particular swath pattern. The information representative of the plurality of the swaths includes, but is not limited to, the end boundary adjacent to the completion of the swath pattern, the number of swaths, the first swath width, the second swath width, and the number of rows of the implement disabled during the final swath.

A feature of the invention includes the capability to generate the swath patterns remotely and the swath pattern and the information representative of the plurality of swath patterns is communicated to the work vehicle.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE INVENTION

The swath generation methodologies described herein may find application in precision agriculture systems used to control crop spraying operations, harvesting operations, cultivation and plowing operations, planting and seeding operations, fertilizer application, or other operations where highly accurate positioning information is used in conjunction with defined patterns of swaths to control transit of a vehicle over a land area. Such systems for precision location determination are generally well known and are exemplified by those disclosed in U.S. Pat. Nos. 6,199,000 and 6,553,299, each entitled "Methods and Apparatus for Precision Agriculture Operations Using Real Time Kinematic Global Positioning Systems" which are incorporated herein in their entirety by reference. Although the various methods will be described with particular reference to GPS satellite-based systems, it should be appreciated that the teachings are equally applicable to guidance systems using other methods to determine vehicle position.

Figure 1:
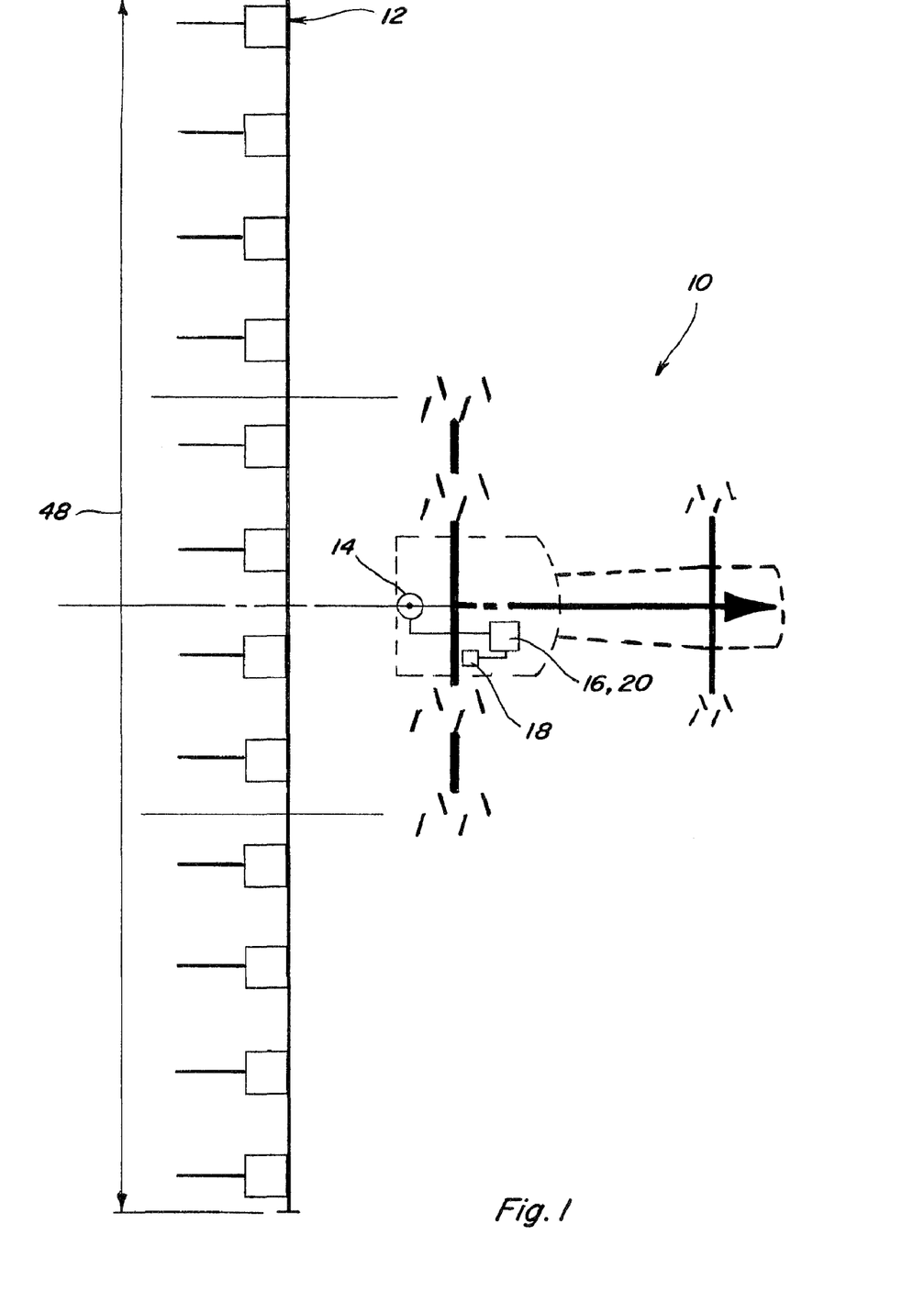
FIG. 1 is a top view of a representative work vehicle having a representative coupled implement associated therewith for use with the present invention.
Figure 2:
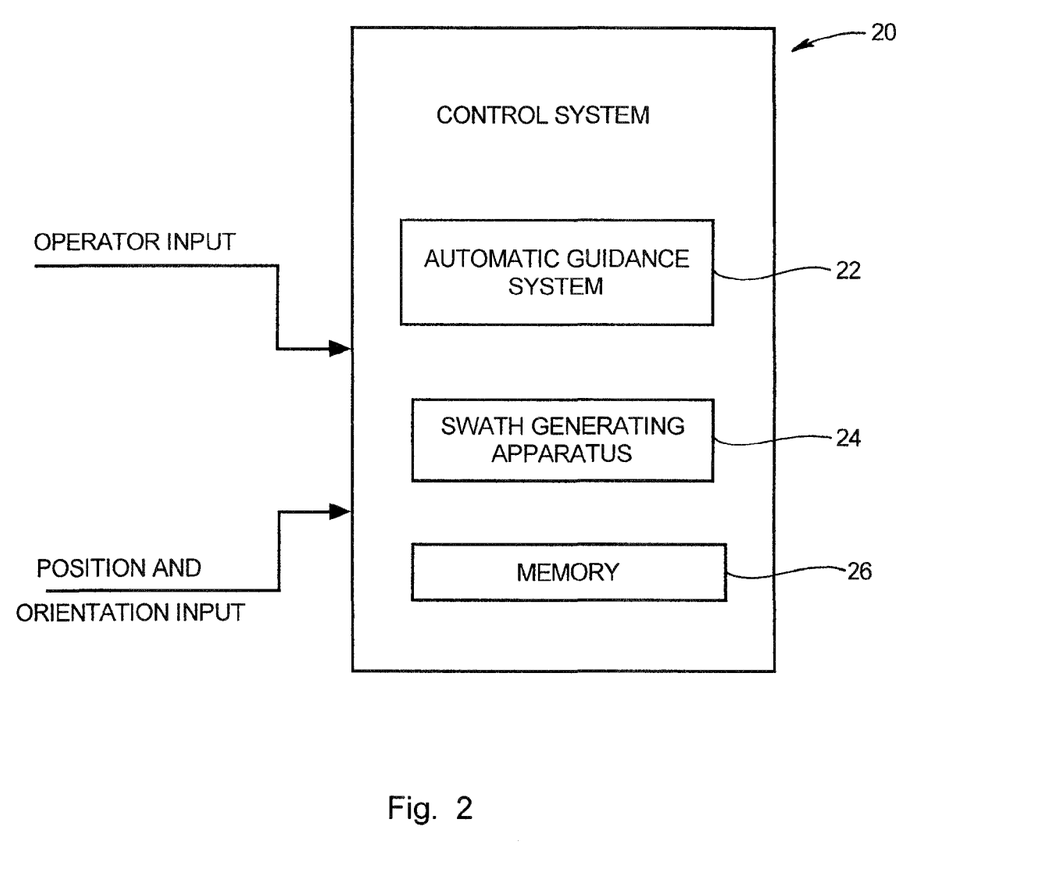
FIG. 2 is a top level representation of an automatic guidance system including a swath generating apparatus for swath pattern generation according to the present invention.

A work vehicle, represented in FIG. 1 by a tractor 10, and an implement 12 coupled thereto is of the type commonly used in agricultural and construction operations. Work vehicles are commonly equipped with a global positioning system (GPS), represented by receiver 14, that provides position information to be determined for use by a control system 20 of an onboard computer 16 to simplify the task of driving tractor 10. Control system 20 associated with tractor 10 typically includes an automatic guidance system 22, a swath generating apparatus 24, and a memory 26 as shown in FIG. 2. Automatic guidance system 22 continually calculates a vehicle steering heading by comparing vehicle position and directional heading to a desired swath line provided by swath generating apparatus 24, and sends the vehicle steering heading to a steering unit, which in turn actuates vehicle steering (i.e., steered wheels), thereby changing the vehicle heading in a well known manner. Although shown as discreet devices within the control system, the functions of automatic guidance system 22, swath generating apparatus 24, memory 26, and other portions of control system 20 can easily be integrated into a single apparatus within the intent of this invention.

Figure 3:
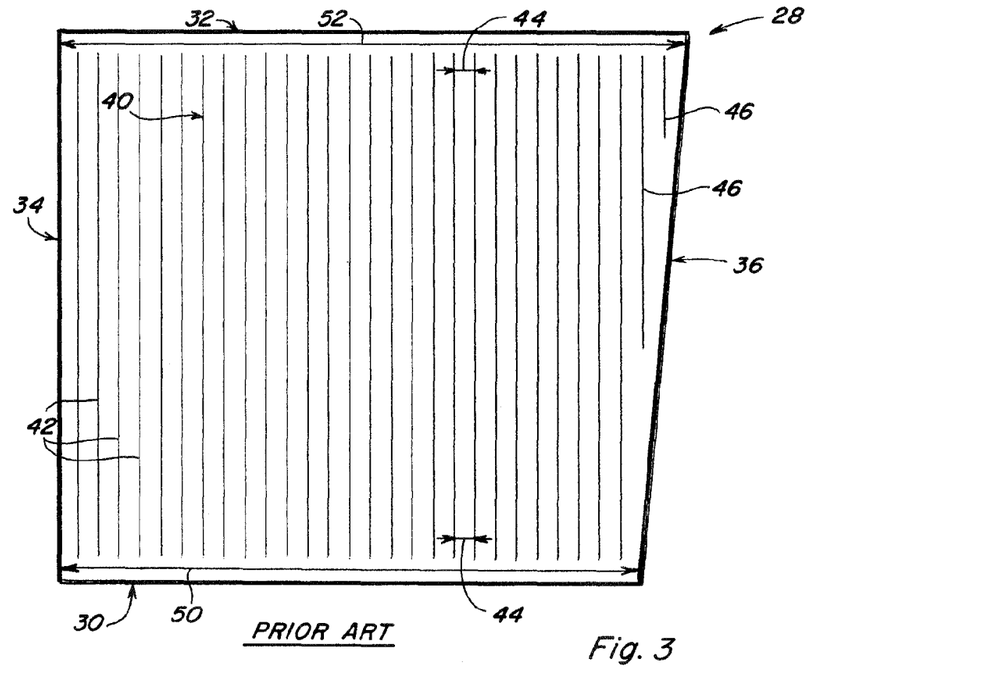
FIG. 3 is a top view of a swath pattern in a representative region of a field having a swath pattern including point rows according to the prior art.
Figure 4:
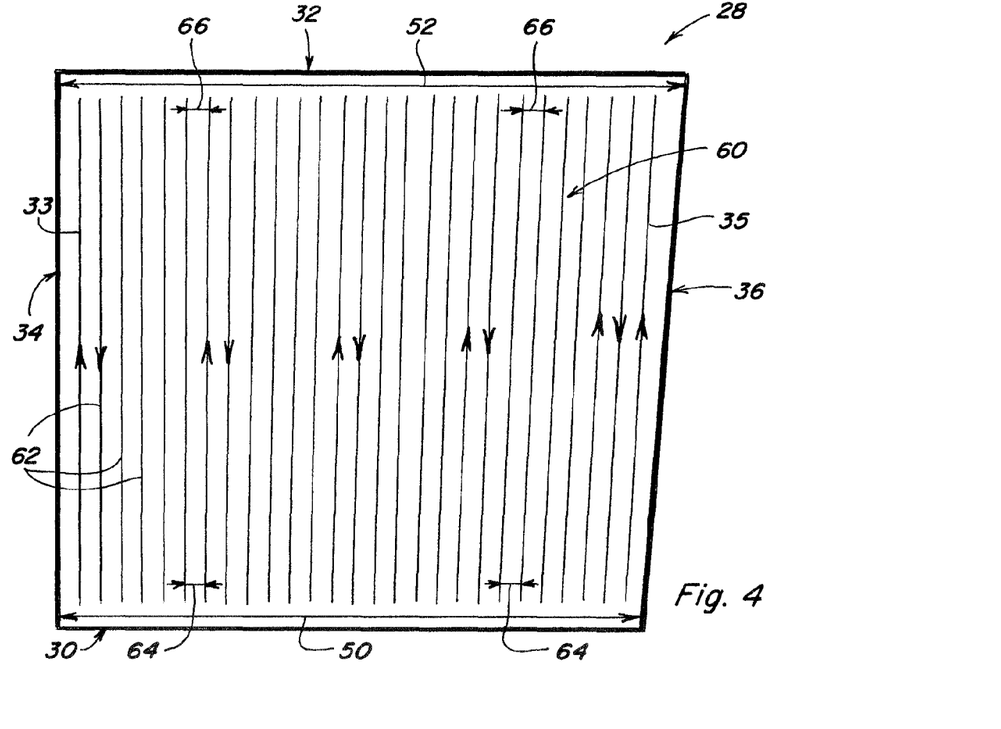
FIG. 4 is a top view of a representative swath pattern avoiding point rows for the region of FIG. 3 according to the present invention.
Figure 5:
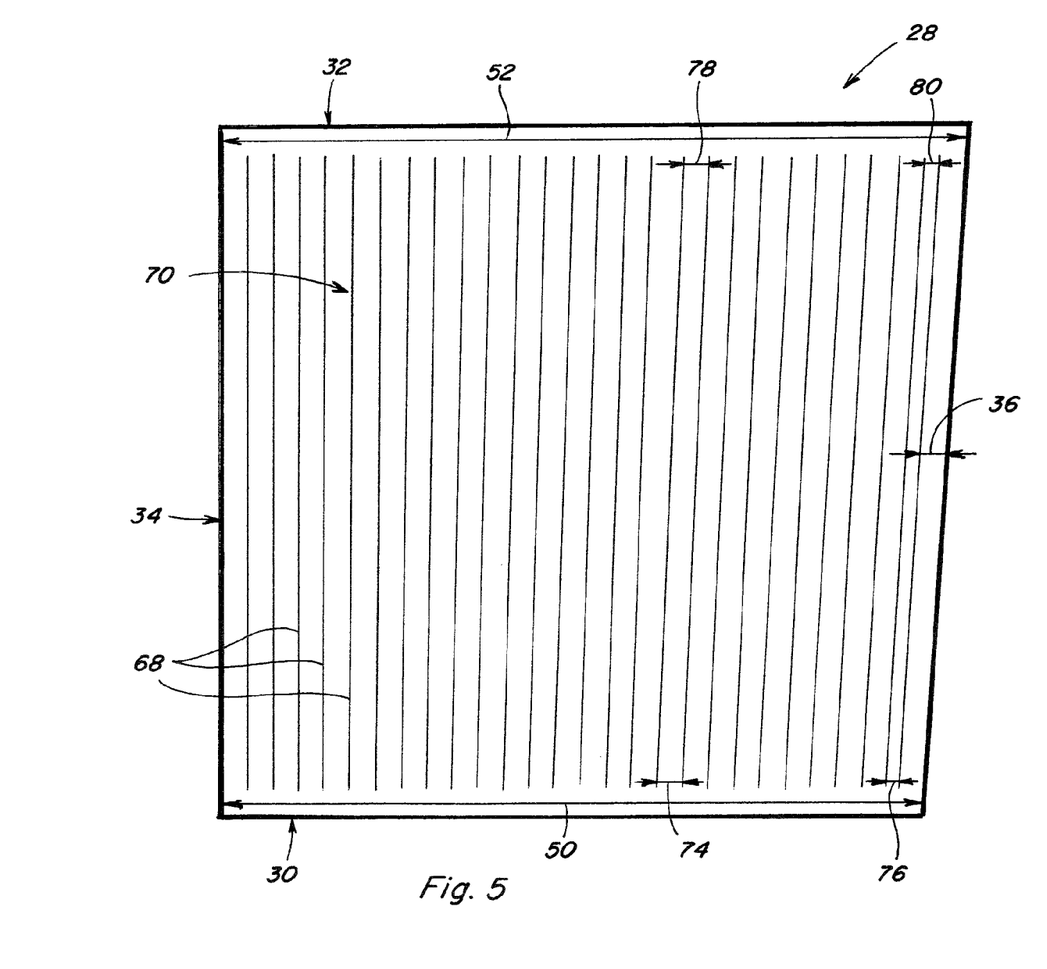
FIG. 5 is a top view of another representative swath pattern avoiding point rows for a quadrilateral region of a field.

FIGS. 3-5 depict a quadrilateral region 28 of a field bounded by a first end boundary 30, a second end boundary 32 opposite to first end boundary 30, a first side boundary 34 and a second side boundary 36 opposite to first side boundary 34, the first and second side boundaries 34, 36 extending divergently between the first and second end boundaries 30, 32. Specifically, FIG. 3 shows a representative swath pattern 40 generated by known methods in the art including swaths having centerlines 42 spaced equally and at a uniform distance 44 apart. Uniform distance 44 is typically a function of at least a lateral extent 48 of implement 12. Because first and second side boundaries 34, 36 diverge as they extend between first and second end boundaries 30, 32, a lateral extent 50 of first end boundary 30 is smaller than a lateral extent 52 of second end boundary 32, and point rows having centerlines 46 are generated near second side boundary 36 as part of swath pattern 40. As explained, hereinabove, in many situations, the point rows of swath pattern 40 are undesirable, and an operator would prefer a swath pattern that avoids such point rows.

Figure 6:
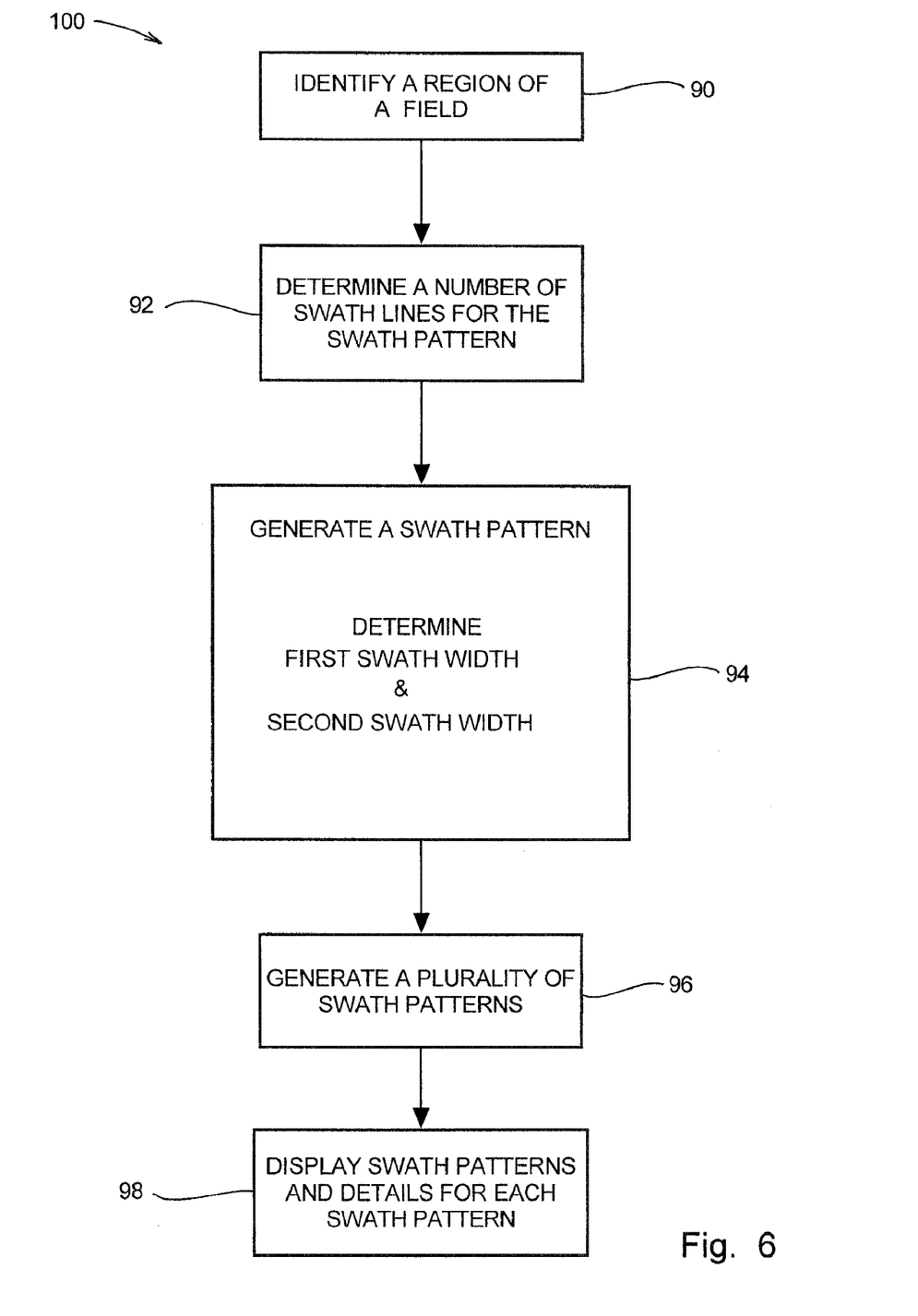
FIG. 6 is a top level flow diagram of a method of the system of the present invention.

According to the present invention, a method 100 for generating a swath pattern avoiding point rows to be driven by the work vehicle for a region of a field, such as the region represented by region 28, is provided, and a top level flow diagram of method 100 is shown in FIG. 6. FIGS. 4 and 5 depict representative swath patterns generated in accordance with method 100. Once region 28 is identified as seen in block 90, a number of swaths for the swath pattern is determined at block 92. The number of swaths is determined as a function of lateral extent 48 of implement 12 of tractor 10 and at least one of first lateral extent 50 of first end boundary 30 and second lateral extent 52 of second end boundary 32. At block 94, a swath pattern, depicted by a representative swath pattern 60 as shown in FIG. 4 is generated. Swath pattern 60 includes side by side individual swaths, and each of the swaths have a centerline 62 extending between first and second end boundaries 30, 32 thereof. Centerlines 62 of the side by side ones of the swaths diverge from first end boundary 30 towards second end boundary 32 substantially uniformly across region 28 from first side boundary 30 to second side boundary 32. It should be noted, that because of the uniform divergence of centerlines 62, a centerline 33 of the first swath is parallel to first side boundary 34 and a centerline 35 of the last swath is parallel second side boundary 36. Point rows, as represented by centerlines 46 of prior art swath pattern 40 of FIG. 3 are avoided when generating swath pattern 60 of FIG. 4 according to the present invention.

According to a preferred embodiment of the present invention, and seen in block 94 of FIG. 6, a first swath width 64 is determined as a function of first lateral extent 50 and the number of swath lines, and a second swath width 66 is determined as a function of second lateral extent 52 and the number of swath lines. As seen in FIG. 4, substantially all centerlines 62 of the side by side ones of the swaths are spaced at first swath width 64 adjacent to first end boundary 30, and substantially all centerlines 62 of the side by side ones of the swaths are spaced at second swath width 66 adjacent to second end boundary 32.

According to an aspect of the invention, the number of swaths is determined as a function of the end boundary adjacent to completion of the swath pattern. For example, if an operator prefers to enter and exit region 28 at the same end boundary, the number of swaths is determined to be an even number, so the swath pattern begins and completes at first end boundary 30. Conversely, as seen in FIG. 4, if the operator prefers to enter region 28 at first end boundary 30 and exit region 28 at second end boundary 32, the number of swaths is determined to be an odd number, and swath pattern 60 begins at first boundary 30 and completes at second boundary 32.

According to another aspect of the invention, determining the number of swaths is a function of a number of individual output controllable rows of the implement 12. Then generating a swath pattern 70 includes generating a final swath represented by a centerline 72 having an adjusted first swath width 76 adjacent to first end boundary 30 and an adjusted second swath width 80 adjacent to second end boundary 32. Adjusted first and second swath widths 76, 80 are adjusted as a function of a number of output disabled rows of implement 12. As an example, swath pattern 70 of FIG. 5 includes individual side by side swaths represented by centerlines 68. A first swath width 74 adjacent to first end boundary 30 and a second swath width 78 adjacent to second end boundary 32 are determined as a function of, at least, lateral extent 48 of implement 12, first and second lateral extents 50, 52 of first and second end boundaries 30, 32, and the number of output disabled rows. The adjusted first and second swath widths 76, 80 are then based on the overlap according to the number of output disabled rows disabled during the final swath.

With reference to FIG. 4, according to yet another aspect of the invention, the additional space between swaths at second end boundary 32 is used to plant additional seeds. Therefore, when second swath width 66 is larger than first swath width 64, the output of at least one outermost individual row of implement 12 is increased when implement 12 is adjacent to second end boundary 32. Conversely, at first end boundary 30, space between the swaths is decreased, so the output of at least one outermost individual row of the implement is decreased when implement is adjacent to the first end boundary. The increase or decrease in output of individual rows may be dependent on second or first swath widths, respectively.

According to another embodiment of the invention, and seen in blocks 96 and 98 of FIG. 6, a plurality of swath patterns for region 28 are generated and information representative of the plurality of swath patterns is displayed for the operator for selection of a particular swath pattern. The information representative of the plurality of swath patterns includes, but is not limited to, information representative of the end boundary adjacent to the completion of the swath pattern, the number of swaths, the first swath width, the second swath width, and the number rows of the implement disabled during the final swath.

The plurality of swath patterns and the information representative thereof may be generated on-board tractor 10 by swath generating apparatus 24 of control system 20 and displayed on an input apparatus 18 as shown in FIG. 1. The operator may input or select a particular choice of swath pattern at input apparatus 18. According to another aspect of the invention, the plurality of swath patterns may be generated remotely and the swath patterns and the information representative thereof may be communicated to tractor 10 and stored in memory 26.

As an advantage of this invention, the operator may work a nonrectangular shaped field without resorting to point rows. As a further advantage, the operator has a choice from a plurality of swath patterns that do not include point rows, and the operator may choose a particular swath pattern based on a particular application.

Any reference herein to the terms "left" or "right," "up", or "down," or "top" or "bottom" are used as a matter of mere convenience, and are determined by standing at the rear of the vehicle facing in its normal direction of travel. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A method for generating a swath pattern for a work vehicle over a region having an outer perimeter defined by at least four boundaries of a field, the work vehicle having an implement connected thereto, the work vehicle including a computer having a control system capable of sending and receiving data, the outer perimeter of the region of the field stored in the computer of the control system, the method comprising the steps of:
   calculating via a computer processor a number of swaths for the swath pattern as a function of
      a lateral extent of the implement of the work vehicle, and
      at least one of a first lateral extent of a first end boundary and a second lateral extent of a second end boundary including calculating a swath width of at least one swath positioned longitudinally near one of a first side boundary and a second side boundary of the region as a function of
         (a) the lateral extent of the implement,
         (b) the boundaries of the region to be planted,
         (c) a number of individual output controllable rows of the implement,
         (d) overlap of existing planted areas in the swath, and
         (e) the number of individual output controllable rows available to be disabled; and
   generating the swath pattern including side by side individual swaths, each of the swaths having a centerline extending between the first and second end boundaries thereof, the centerlines of the side by side swaths diverging from the first end boundary towards the second end boundary substantially uniformly across the region from the first side boundary to the second side boundary wherein the swath width of the at least one swath positioned longitudinally near one of the first side boundary and the second side boundary is generated without causing re-planting of a portion of an overlapped adjacent swath by disabling the individual output controllable rows which overlap an area of the adjacent swath which has already been planted.

2. The method of claim 1, wherein the step of generating the swath pattern further comprises the steps of:
   determining a first swath width as a function of the width of a first lateral extent;
   determining a second swath width as a function of the width of a second lateral extent; and
   generating the swath pattern for the field, wherein substantially all of the centerlines of the side by side ones of the swaths are spaced at the first swath width adjacent to the first end boundary, and substantially all of the centerlines of the side by side ones of the swaths are spaced at the second swath width adjacent to the second end boundary.

3. The method of claim 2, wherein the number of swaths is determined as a function of the end boundary adjacent to completion of the swath pattern, such that the number of swaths is even when the swath pattern is completed adjacent to the first end boundary and the number of swaths is odd when the swath pattern is completed adjacent to the second end boundary.

4. The method of claim 1, wherein the step of calculating the number of swaths is a function of a number of individual output controllable rows of the implement, and the step of generating the swath pattern includes generating a final swath having an adjusted first swath width adjacent to the first end boundary and an adjusted second swath width adjacent to the second end boundary, the adjusted first and second swath widths being adjusted as a function of a number of output disabled rows disabled during the final swath.

5. The method of claim 4, further comprising the steps of:
   generating a plurality of swath patterns for the region; and
   displaying information representative of the plurality of swath patterns for selection of a particular swath pattern via an apparatus connected to the computer.

6. The method of claim 5, wherein the step of displaying information representative of the plurality of swath patterns for a region includes displaying, for each of the plurality of swath patterns, information representative of the end boundary adjacent to the completion of the swath pattern, the number of swaths, the first swath width, the second swath width, and the number rows of the implement disabled during the final swath.

7. The method of claim 1, wherein at least one of the steps of calculating or generating is: (a) accomplished remotely and communicated to the control system, or (b) accomplished by the control system of the computer.

8. The method of claim 4, further comprising the step of when the second swath width is larger than the first swath width, increasing the output of at least one outermost individual row of the implement when the implement is adjacent the second end boundary.

9. The method of claim 4, further comprising the step of when the second swath width is larger than the first swath width, decreasing the output of at least one outermost individual row of the implement when the implement is adjacent to the first end boundary.

10. The method of claim 1, wherein no point rows are included in the swath pattern.

11. A method for generating a swath pattern for a work vehicle over a region having an outer perimeter defined by at least four boundaries of a field, the method comprising the steps of:
   providing a work vehicle carrying a computer having a control system capable of sending and receiving data, the outer perimeter of the region of the field stored in the computer of the control system;
   providing an implement having a lateral extent connected to the work vehicle;
   calculating via a computer processor a number of swaths for the swath pattern as a function of
      a lateral extent of the implement of the work vehicle, and
      at least one of a first lateral extent of a first end boundary and a second lateral extent of a second end boundary including calculating a swath width of at least one swath positioned longitudinally near one of a first side boundary and a second side boundary of the region as a function of
         (a) the lateral extent of the implement,
         (b) the boundaries of the region to be planted,
         (c) a number of individual output controllable rows of the implement,
         (d) overlap of existing planted areas in the swath, and
         (e) the number of individual output controllable rows available to be disabled; and
   generating the swath pattern dividing the region into side by side adjacent individual swaths extending from the first side boundary to the second side boundary, each of the swaths including centerlines extending divergently between the first end boundary and the second end boundary, the centerlines of each of the adjacent swaths diverging from the first end boundary towards the second end boundary substantially uniformly across the region from the first side boundary to the second side boundary, wherein the swath width of the at least one swath positioned longitudinally near one of the first side boundary and the second side boundary is generated without causing re-planting of a portion of an overlapped adjacent swath by disabling the individual output controllable rows which overlap an area of the adjacent swath which has already been planted.

12. The method of claim 11, wherein the step of calculating the number of swath lines for the swath pattern includes selecting an even number of swaths, such that the work vehicle enters and exits the region along the first end, or an odd number of swaths, such that the work vehicle enters the region along the first end and exits the region along the second end.

13. The method of claim 11, wherein the implement has a plurality of individually controllable rows, the control system is configured and operable for controlling an output of a number of individual rows of the implement, and the step of generating the swath pattern includes generating a final swath having an adjusted first swath width adjacent to the first end boundary and an adjusted second swath width adjacent to the second end boundary, the adjusted first and second swath widths being a function of the first and second swath widths, respectively, and the number of rows of the implement having the output disabled during the final swath.

14. The method of claim 13, further comprising the step of: displaying details associated with the plurality of swath patterns via an apparatus connected to the computer, the details including the number of swaths, the first and second swath widths, the adjusted first and second swath widths, the number of output disabled rows of the implement during the final swath.

15. The method of claim 11, wherein at least one of the steps of calculating or generating is: (a) accomplished remotely and communicated to the control system, or (b) accomplished by the control system of the computer.

16. The method of claim 14, wherein the control system of the computer of the work vehicle includes a swath generating apparatus and an input apparatus, the plurality of swath patterns is generated as a function of inputs from the operator to the input apparatus, the plurality of swath patterns and the details associated therewith are displayed on the input apparatus, and the operator inputs a particular swath pattern selection to the input apparatus.

17. The method of claim 13, such that when the second swath width is larger than the first swath width, the control system increases the output of at least one outermost individual row of the implement adjacent to the second end boundary.

18. The method of claim 13, such that when the second swath width is larger than the first swath width, the control system decreases the output of at least one outermost individual row of the implement adjacent to the first end boundary.

19. The method of claim 11, wherein swath widths between individual swaths adjacent to the lateral extent having a greater width have a substantially uniform and greater width relative to the other swath widths between individual swaths adjacent to the other, opposite lateral extent, which have a substantially uniform but relatively smaller width.

20. The method of claim 11, wherein no point rows are included in the swath pattern.

\* \* \* \* \*